US010378193B2

(12) United States Patent
Smith

(10) Patent No.: US 10,378,193 B2
(45) Date of Patent: *Aug. 13, 2019

(54) SINK CLAMP AND METHODS

(71) Applicant: David C Smith, Chattanooga, TN (US)

(72) Inventor: David C Smith, Chattanooga, TN (US)

(73) Assignee: Z KEEPERS, LLC, Bradenton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/824,647

(22) Filed: Nov. 28, 2017

(65) Prior Publication Data

US 2018/0080205 A1 Mar. 22, 2018

Related U.S. Application Data

(63) Continuation-in-part of application No. 14/566,112, filed on Dec. 10, 2014, now Pat. No. 9,828,754.

(51) Int. Cl.
*E03C 1/33* (2006.01)
*F16B 2/06* (2006.01)

(52) U.S. Cl.
CPC .............. *E03C 1/335* (2013.01); *F16B 2/065* (2013.01)

(58) Field of Classification Search
CPC .. E03C 1/335; F16B 2/065; F16B 2/14; F16B 2/18
USPC .............................................................. 4/633
See application file for complete search history.

(56) References Cited

U.S. PATENT DOCUMENTS

| | | | | | |
|---|---|---|---|---|---|
| 2,846,695 | A * | 8/1958 | Hartog | E03C 1/335 | 108/25 |
| 3,008,149 | A * | 11/1961 | Eynon | E03C 1/335 | 126/214 R |
| 3,365,732 | A | 1/1968 | Juergens et al. | | |
| 4,432,106 | A | 2/1984 | Smith | | |
| 6,986,174 | B2 | 1/2006 | Brown | | |
| 9,828,754 | B2 * | 11/2017 | Smith | E03C 1/335 | |
| 2003/0215304 | A1 * | 11/2003 | Natero | E03C 1/33 | 411/107 |
| 2006/0218723 | A1 | 10/2006 | Schneider et al. | | |
| 2012/0311780 | A1 * | 12/2012 | Pridemore | E03C 1/33 | 4/633 |
| 2014/0223700 | A1 | 8/2014 | da Silva | | |
| 2015/0059084 | A1 | 3/2015 | Hocaoglu | | |

* cited by examiner

*Primary Examiner* — Tuan N Nguyen
(74) *Attorney, Agent, or Firm* — Cygan Law Offices P.C.; Jeffrey S. Dixon

(57) ABSTRACT

A clamping device for mounting a sink to a counter includes a clamp having a clamp body and a binding spring of a flat-profile, bending type ("bending spring"), a binding lip for insertion through a first slot in the bottom surface of the countertop adjacent to the sink, the clamp and binding lip connected to the clamp body and extending away therefrom at least partially over an edge of the sink, and a clamp screw for insertion through a first opening in the clamp body and against a flange of the sink. The clamp screw may be covered by a screw cap, and a solid portion of the binding spring may be disposed between the clamp screw and the sink flange, or an opening in the binding spring may permit the clamp screw to press directly against the sink flange.

26 Claims, 7 Drawing Sheets

SINK CLAMP AND METHODS

CROSS-REFERENCE TO RELATED APPLICATION

This application is a continuation-in-part of U.S. patent application Ser. No. 14/566,112, filed Dec. 10, 2014, the entire disclosure of which is hereby incorporated by reference.

FIELD OF THE INVENTION

The present invention relates to the countertop industry. More particularly, the present invention relates to mounting clamps which connect sinks to countertops.

BACKGROUND OF THE INVENTION

Conventional clamp methods and systems for attaching an undercounter sink to the underside of a counter, especially when the counter is made of granite or another hard surface, are time consuming and of ten subject to failure due to human error. In one conventional system, a sink is attached a counter using clips, typically supplied with the sink, that require drilling into the hard surface of the counter with an oversize diamond drill, inserting a threaded insert into the hole drilled therein utilizing a two-part epoxy, and then attaching the sink to the threaded insert with a screw and a clip to clamp the sink into place. This conventional system is time-consuming to install, and overtightening of the screw may cause the insert to pull out of the counter, while attaching the screw and the clip in the confined space under the counter is often difficult.

Another conventional system requires wider undercutting a slot into the hard material of the countertop and then inserting a nut fastener into the slot with the head received and retained above the slot and the shaft extending downwardly through the slot. The sink is fit over the fastener from below, and then a clip and nut are required to clamp the sink to the countertop by the fastener. This system can create a strong clamping of the sink, but is also believed to be difficult and time consuming to implement.

In another conventional system, special studs are typically glued to the underside of the countertop using a two-part epoxy, and the sink is held to the counter by tightening a clip and nut to the studs similar to the systems described above. In this system, the sink is directly attached to the counter only by gluing means, which is believed to create reliability problems. Implementation of this system is also believed to be difficult to perform in confined spaces, such as when the countertop is attached to the counter prior to installation of the sink.

Another known method is to build a wooden cradle under the countertop for the sink to rest upon. In addition to being labor intensive, this method typically renders the sink irremovable from the countertop.

A similar conventional method is to hang the sink on a wire sling attached to the base of the counter cabinet. This method, however, is also very time-consuming to implement, and difficult to standardize among sinks and cabinets of varying size.

A still further method of attaching a sink to a granite or stone countertop is believed to require first cutting slots into the underside of the countertop to accept "L" shaped spring clips. Such spring clips, however, usually require at least two pieces, and must be hammered into place, which is very difficult in the confined space under the sink. This method is costly, and moreover, the required hammering action risks damaging the sink and countertop material. Additionally, extreme care must be taken when cutting the slots, which must be perpendicular to the surface of the countertop, or the countertop could be ruined. Yet another method and direction is shown in U.S. Published Patent Application No. 2012/0311780 which shows the drilling of holes into the underside of the countertop. Drilling holes into the countertop is believed to be slow in many circumstances.

In addition, some undercounter sink attachment methods involve securing a mounting support in place by tightening a screw against the underside of a sink flange. In these methods, rotating contact of the screw end face may frictionally transmit a torque to the sink flange, causing the sink to rotate or otherwise shift out of a desired mounting position.

SUMMARY OF THE INVENTION

The present clamping device, system, and methods are believed to allow for an advantageous quick and easy attachment of a sink to an underside of a counter.

In an embodiment, a clamping device is provided for mounting a clamped article to a counter, particularly where the clamped article is a sink. The clamping device provides a clamp having a clamp body, an optional clamp spring, and a binding lip for insertion into a slot in a surface of the counter adjacent to a sink. The clamp body and binding spring are connected to the binding lip and extend away therefrom at least partially over an edge of the clamped sink. A clamp screw is then inserted through an opening in the clamp body and against a portion of the binding spring interposed between the clamp screw and an edge (e.g., a peripheral flange) of the clamped sink, to apply an axial clamping force to the edge of the sink, the clamping force producing a reaction bending moment in the clamp body tending to increase a frictional force between the binding lip and the slot to resist removal of the binding lip from the slot. Alternatively, the clamp screw extends through a clamp screw opening in the binding spring to bear directly against an edge of the clamped sink. Optionally, a cap is disposed over an end of the clamp screw. The cap may be disposed between the clamp screw and the edge of the sink to transmit the axial clamping force from the screw to the edge of the clamped sink and to isolate the clamped sink from torque applied to tighten or loosen the clamp screw while the clamp screw is engaging the edge of the sink.

In another embodiment, a counter system includes a countertop, a sink configured to fit with an opening of the countertop, and plumbing, as well as at least one, if not a plurality, of clamping devices for attaching the sink to the countertop. The clamping devices include a clamp including an opening disposed toward an end of a clamp body and a binding lip inserted internal to the countertop from a bottom surface. The binding lip is integrally formed with the clamp body for insertion into a slot in a lower or bottom surface of the countertop adjacent to the sink external to a perimeter of the sink, and a clamp screw for insertion through the opening in the clamp body and against the edge of the sink or the binding spring, if utilized.

In another embodiment, a method of installing a sink to a countertop includes the steps of forming an opening in the countertop corresponding to a shape of an outer edge of the sink, the opening being smaller than a perimeter of the outer edge of the sink, positioning the sink about the opening in the countertop, grinding a plurality of slots partially through a thickness of the countertop from the bottom, the plurality of slots located adjacent to but outside of the perimeter of the outer edge of the sink, inserting a binding lip of one of a plurality of clamping devices through each respective slot to assist in holding the sink against the countertop, threading a plurality of clamp screws into a respective first opening of each of a plurality of clamp bodies of the plurality of clamping devices, each of the clamp bodies having second openings for connecting the binding spring to the clamp body, and each of the first openings preferably being disposed below the outer edge of the sink, and tightening each of the plurality of clamp screws against the outer edge of the sink (or binding springs) to securely install the sink against the countertop. The binding lips may be held by friction and/or adhesives in the slots.

BRIEF DESCRIPTION OF THE DRAWINGS

The particular features and advantages of the invention as well as other objects will become apparent from the following description taken in connection with the accompanying drawings in which.

DETAILED DESCRIPTION OF EMBODIMENTS OF THE INVENTION

Figure 1:
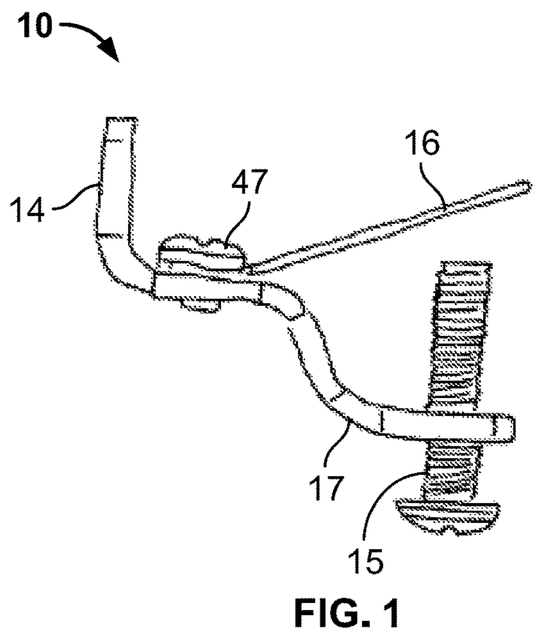
FIG. 1 is a side elevation view of a clamping device, according to an embodiment.

FIG. 1 illustrates a clamping device 1 according to an embodiment. In an embodiment, the clamping device 1 includes a clamp 10, a binding lip 14, and a clamp screw 15. The clamp 10 may further include a clamping spring 16 and a clamp body 17 extending away from the binding lip 14 at substantially a right angle to a lengthwise direction of the binding lip 14. The clamp 10 is configured to apply force as described below.

Figure 2:
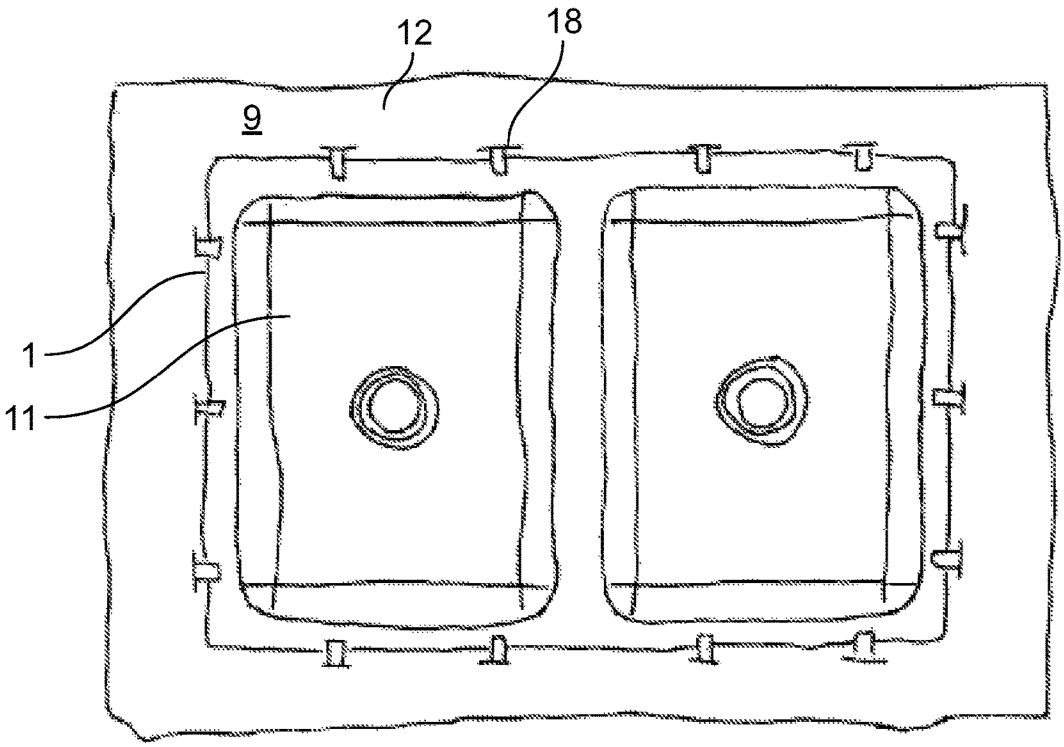
FIG. 2 is a bottom plan view of a sink attached to a counter surface utilizing the clamping devices of FIG. 1.

FIG. 2 illustrates a sink 11, which may be positioned below and about a sink opening 13, and attached to a lower/under surface of a countertop 12 by utilization of one or more of clamping devices 1. The countertop 12 may have at least one slot or a plurality of slots 18 ground into the lower surface to receive the lip 14 of a respective clamping device 1. Each slot 18 may be adjacent to a nearest edge of the sink 11. In an embodiment, a slot 18 may be ⅞" deep ground with a 4" or other diameter grinding wheel to accept an approximately sized binding lip 14. All or individual components of the clamping device 1 may be formed of rigid steel or plastic, or a material of sufficient strength to hold the sink 11 to the countertop 12 without breaking or separating. The binding spring 16 and/or clamp body 17 may be alternatively formed of spring steel, or another strong but flexible material. The binding lip 14 may be made of a rigid material, such as steel, plastic, or a reinforced resin.

Preferably the clamp 10 is a unitary or integral structure of the clamp body 17 formed with the binding lip 14 from a single material, such as a bent metal product. The clamp body 17 is preferably formed from a planar member with a single width that has been bent into a desired shape to provide the binding lip 14 as well as the clamp body 17 as illustrated. For many embodiments, manufactured in this manner, the thickness 42 is less than half of the width 32, and the thickness 42 is less than ⅓ of the width 32 or less than ¼ of the width. This is believed to provide a secure fit within a slot 18 such as is shown in FIG. 2. In the illustrated embodiment, the clamping body 17 has a first portion 43 which may be parallel to a second portion 45. Clamp screw 15 is shown proceeding through first bore or hole 9 and the spring screw 47 may then be inserted through bore or hole 25 of binding spring 16 and secured into the second hole or bore 7 as illustrated.

The clamp body 17, the binding spring 16, the binding lip 14 and the clamp screw 15 can be seen in FIG. 1.

Figure 5:
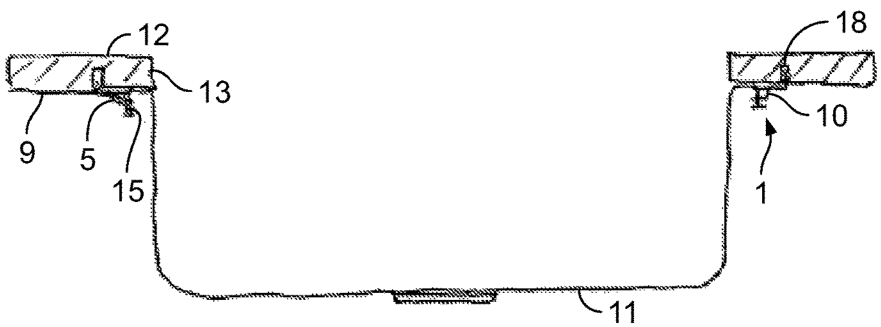
FIG. 5 is a cross sectional view of a sink attached to a counter surface utilizing the clamping devices of FIG. 1.

FIG. 5 illustrates an enlarged portion of the partial sectional side view of the embodiment shown in FIG. 2. In the example of FIG. 2, the slot 18 may be formed only part of the way into the countertop 12 from its underside. As best seen with respect to FIGS. 1 and 2 as well, the binding lip 14 may then be inserted into the slot 18 directly. In an embodiment, the binding spring 16 may be screwed directly to the clamp body 17 at one end thereof such as with clamp screw 15.

Once the binding lip 14 is so inserted into the slot 18, the clamp screw 15 may be inserted into a first hole 9 in the clamp body 17, which itself may be positioned over a nearest edge of a rim (or flange) 5 of the sink 11. Once so positioned, the clamp screw 15 may be turned (typically clockwise) in the second hole 7, which may be threaded to correspond to the threading of the clamp screw 15 to enable the clamp screw 15 to push an opposing end 3 of the binding spring 16 down against the sink rim 5, causing the binding lip 14 to bind in the slot 18 while simultaneously clamping the sink 11 to the countertop 12. The opposing end of the binding spring 16 may be solid, and need not include an additional opening corresponding to the clamp screw 15.

Figure 6:
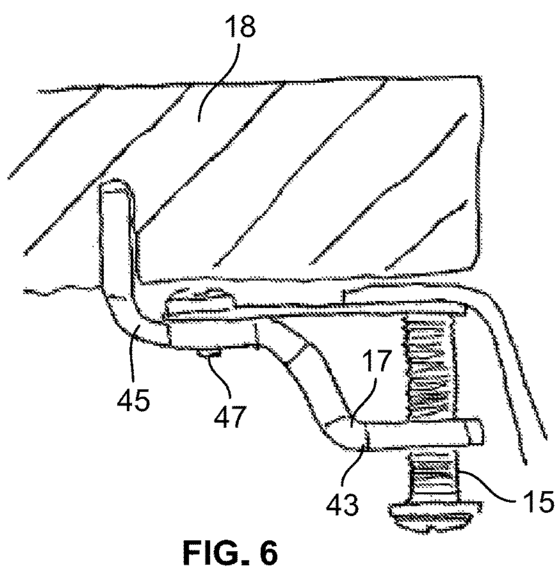
FIG. 6 is an enlarged portion of the partial sectional side view of the embodiment shown in FIG. 5.
Figure 6A:
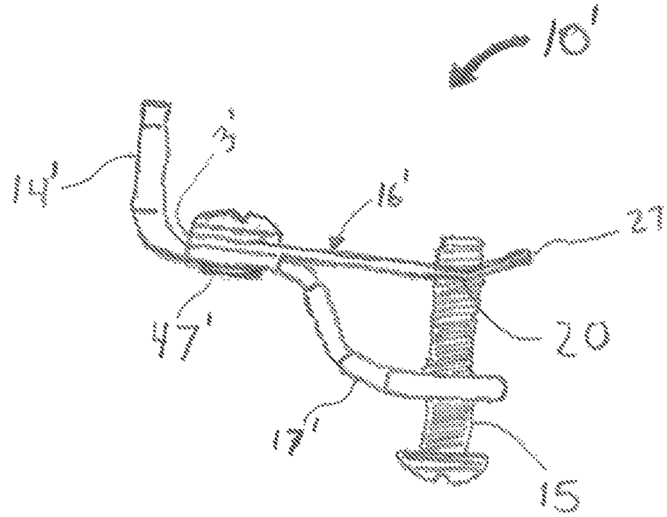
FIG. 6A is a side elevation view of a clamping device, according to another embodiment.
Figure 6B:
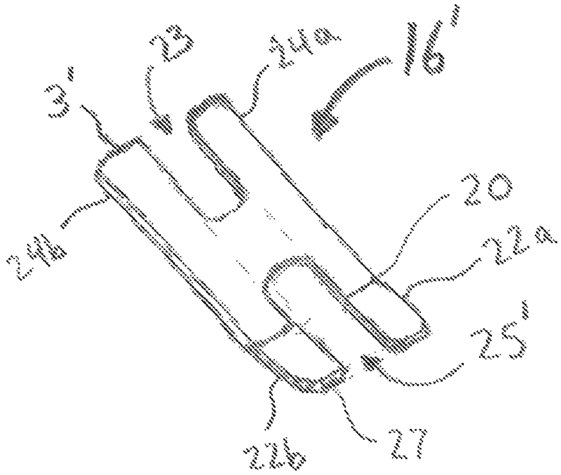
FIG. 6B is a perspective view of a spring of the clamping device shown in FIG. 6A.
Figure 6C:
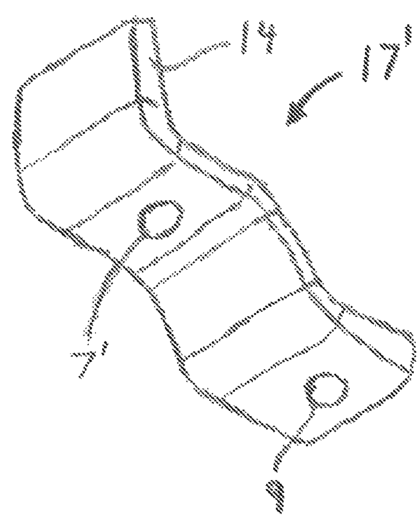
FIG. 6C is a perspective view of a clamp body of the clamping device shown in FIG. 6A.
Figure 9:
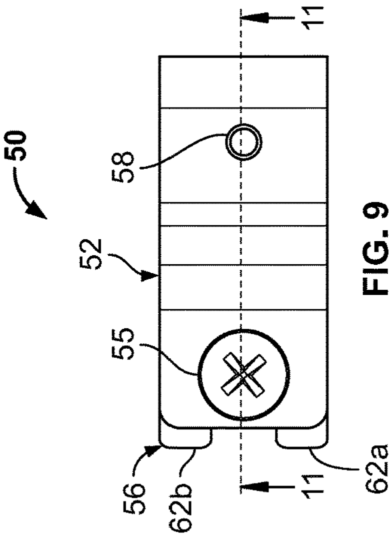
FIG. 9 is a bottom plan view of the clamping device shown in FIG. 7.
Figure 11:
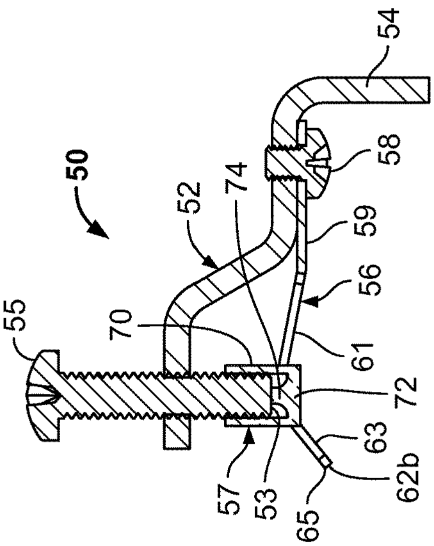
FIG. 11 is a cross-sectional inverted side elevation view of the clamping device shown in FIG. 7.

On the other hand, with reference to FIGS. 6A-6C, illustrating a clamping device 10', the opposing end of a modified binding spring 16' may include an additional opening 23 corresponding to clamp screw 15. Opening 23 is an open-ended slot defined by spaced apart tabs **24*a* and 24*b*, which terminate at an end 3' of binding spring 16'. Binding spring 16' may also include an opening 25' of similar length and width to opening 23, defined by spaced apart tabs 22*a* and 22*b* which terminate at an end 27 opposite to end 3' of binding spring 16'. Opening 25' of binding spring 16' serves in lieu of the corresponding spring screw bore or hole 25 of binding spring 16 to receive a spring screw 47', while tabs 22*a* and 22*b* are clamped between the head of spring screw 47' and a clamp body 17', to retain binding spring 16'. With reference to FIG. 6C, Clamp body 17' includes a clamp screw hole 7' configured to receive spring screw 47'. Thus, binding spring 16' may be reversibly attached to clamp body 17', either at end 3' as shown in FIG. 6A, or at end 27 analogously to FIG. 1. It will be appreciated that reversible attachment of binding spring 16' allows the position of a relief bend 20 and free end of binding spring 16' to be varied as desired, such as to fit space requirements and/or to achieve a desired bending resistance response to deflection of binding spring 16' by contact with a sink rim or flange, such as sink rim 5**.

Figure 3:
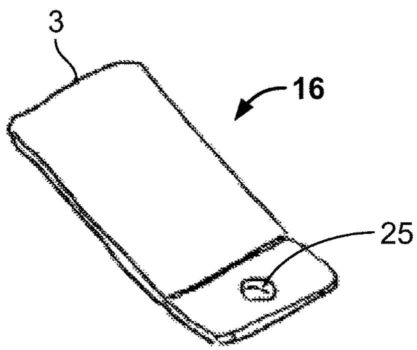
FIG. 3 is a perspective view of the binding system as shown in FIG. 1.
Figure 4:
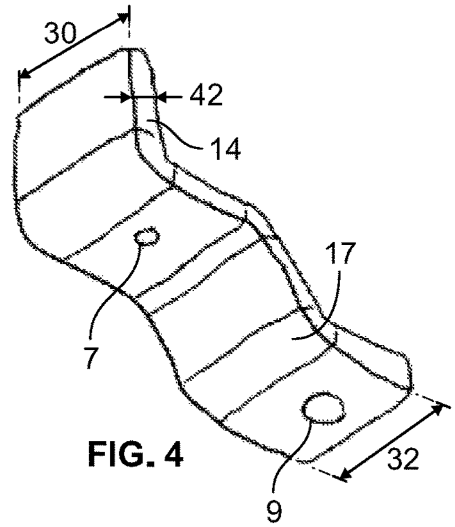
FIG. 4 is a perspective view of the clamp body as shown in FIG. 1.

In a method of using clamping devices according to the invention, with reference to clamping device 1 for illustrative purposes, the sink 11 may be positioned under the sink opening 13 (or to the underside of the countertop 12 if the countertop itself has not yet been installed to a counter) in the countertop 12. In an embodiment, countertop 12 may be made of granite or another hard surface material. The binding lip 14 of each clamping device 1 may be received in a respective slot 18. The countertop 12 may include a plurality of slots 18 sufficient to hold the sink 11 securely to the countertop 12. The binding lip 14 may be inserted into the slot 18. The corresponding hole in the binding spring 16 may receive a fastener such as a rivet or spring screw 47 at first end 29 of binding spring 16 which may be opposite second end 3. The spring screw 47 may also be directed through a first hole 31 in the clamp body 17 to retain binding spring 16 to the clamp body 17. In an embodiment, the minimal pressure may be by hand or tapping from a hammer or mallet. In an embodiment, the binding lip 14 may be held into place in the slot 18 by static friction from appropriate sizing of the slot 18 with respect to the binding lip 14 or by inclusion of a wax coating or possibly an adhesive on the binding lip 14, which may allow additional friction between the binding lip 14 and the slot 18, as best seen in FIG. 3.

Once the binding lips 14 are positioned in the respective slots 18, the clamping device 1 may be distributed around the sink 11 to support the weight of the sink 11 on the respective clamp bodies 17. While the weight of the sink 11 is so supported by the clamp bodies 17, a fitter may be able to move the sink 11 on the clamping devices 1 to fit the sink 11 into a desired position about the sink opening 13. Once the sink 11 is in the desired position about the sink opening, the clamp screw 15 may be screwed into the opposing end of the clamp body 17 away from the respective solid end of the binding spring 16 that presses against the edge of the sink 11. The tightening of the clamp screw 15 to separate the clamp body 17 and binding spring 16 at the opposing end of the clamp 10 typically causes the first end of the binding spring 16 and clamp body 17 about the binding lip 14 to securely pull against the binding lip 14 and thereby clamp the sink 11 to the countertop 12. In the fully installed position, each clamping device 1 may be capable of carrying a significantly greater amount of weight placed on each clamp body 17. A shape of the clamp 10 allows the holding strength to become stronger when more pressure is exerted to the clamp screw 15 either by torque or by separation force between clamp 10 and countertop 12.

In an embodiment, the binding lip 14 may have ridges cut into it to allow for additional gripping friction within the slot 18. A wax adhesive or sacrificial substance may additionally be applied to the binding lip 14 in this example to further aid the clamping device 1 to be pressure fitted with and into the slot 18. As best seen in FIG. 1, the opposing end of the clamp 10—including the clamp body 17 and binding spring 16—may be configured to accept sinks 11 of various flange thicknesses, or even a varying thickness around the flange of a single sink 11, without having to include additional parts to clamp the edge to countertop 12. The shape of the clamp 10 provides for a universal fitting. Additionally, according to an embodiment, the friction of the binding lip 14 within the slot 18 may, when clamped, securely hold the sink 11 to the countertop 12 when the binding lip 14 is fully inserted through the clamp 10 into the slot 18 (e.g., FIG. 1), or when the binding lip 14 is only partially inserted through the clamp into the slot 18. The binding lip may thus be of sufficient length to allow for universal fitting to countertops of varied, or varying, thicknesses, without having to shorten the length of the binding lip.

Other embodiments of the present clamping device are contemplated by the present inventor, including a clamp 10 without a binding spring 16, where the clamp body could serve as the entire clamp. In this example, the clamp screw 15 will press directly against the edge of the sink 11 when tightened, instead of the binding spring 16. The clamping device would otherwise function the same as described above. The binding lip 14 is preferably the same width 30 as a clamp body width 32 and is formed of a single piece of material (i.e., a single piece of unitary material and/or integral and/or integrally formed).

In an embodiment, the sink 11 may be installed to a countertop 12 utilizing the clamping device 1 according to the following steps. The countertop 12 may first be placed bottom side up on a workbench (not shown), for easier access to a fitter. Where the countertop is made of a very heavy and hard material such as granite, it may be particularly advantageous to work on the bottom side from above the countertop 12 prior to its installation to a counter. The sink 11 may then be placed substantially into position on the bottom side of countertop 12. A mark may then be placed on the countertop 12 at a desired position of the aligning slots about the binding lip 14 of each clamping device 1 about the edge of the sink 11. In an embodiment, the respective marks may be approximately ½" from the edge or perimeter of the sink 11. The slots 18 may then be ground at each of the marks to receive the respective binding lips 14. In an embodiment, the slots 18 may be ¼' in width and ⅞" deep into a thickness of the countertop 12. The slots 18 preferably do not pass all the way through the countertop 12. The countertop 12 may then be installed onto cabinets of a counter by conventional methods.

In some embodiments, the clamping device 1 may be pre-assembled, such that the binding lip 14, clamp screw 15, binding spring 16, and clamp body 17 are fitted together to only require insertion of the binding lip into a respective slot 18 and tightening of the clamp screw 15. By these configurations, the present embodiments eliminate the need to inventory and keep track of various parts (e.g., flat clips, nuts, inserts, studs, washers, etc.) conventionally needed to attach an article, such as a sink, to a surface.

Furthermore, due to the often very crowded and limited work space available under a kitchen sink, including but not limited to plumbing supply lines and drains, it is conventionally very difficult to use two hands when installing under counter sinks from below, even though use of both hands is typically required in such conventional installations. According to the present embodiments, however, the present clamping devices and methods may be fully implemented through one-handed installation, which greatly simplifies the installation of an under counter sink from below. The binding lip 14 may be directed into the slot 18. Inserting by hand is preferred.

Another advantage to the present embodiments is that no special tooling is required to complete a sink installation. The only tooling required to accomplish the steps described above may be a standard grinder such as one having a diamond blade (if the countertop 12 is made of a hard stone material such as granite, for example). Use of a relatively small width for the slot 18, as described above, also allows for very fast and economical cutting or grinding.

With reference to FIGS. 7-22, clamping devices incorporating an optional clamp screw cap, as well as illustrating examples of variations in spring and clamp body shapes within the scope of the invention, will now be described. In particular, illustrated in FIGS. 7-11 is a clamping device 50 differing from clamping device 1 in the shape of its binding spring; illustrated in FIGS. 12-16 is a clamping device 80 differing from clamping device 1 in the shapes of its binding spring and of its clamp body; and illustrated in FIGS. 17-21 is a clamping device 90 differing from all the previously described clamping devices in the shapes of its binding spring and of its clamp body; each of clamping devices 50, 80, and 90 optionally incorporating a clamp screw cap 57. It is to be understood and noted that "upward", "downward", and related terms in the following disclosure refer to the opposite directions in FIGS. 7-21, which are either bottom views or inverted elevation views of the illustrated clamping devices.

Turning to FIGS. 7-11, clamping device 50 will now be described in greater detail. Clamping device 50 comprises a clamp body 52 with a binding lip 54, a clamp screw 55 optionally capped by clamp screw cap 57, a binding spring 56, and a spring screw 58 attaching binding spring 56 to clamp body 52.

Binding spring 56 includes two bends dividing its length into three segments, namely, a connecting segment 59 that is secured to clamp body 52 by spring screw 58, followed by a downturned middle segment 61 adjacent to connecting segment 59, in turn followed by an upturned, deflectable contact segment 63 adjacent to middle segment 61. The downward orientation of middle segment 61 provides room for deflectable contact segment 63 to extend upwardly from a proximal end of contact segment 63 meeting a distal end of middle segment 61 to a desired location of a distal end 65 of contact segment 63. That desired location of distal end 65 may be selected to control or limit the distance that it deflects when clamping device 50 is in use. For example, limiting the amount of deflection may help to ensure that a distal end 65 of contact segment 63 remains in contact with a sink flange as binding spring 56 is deflected, so that the entire length of binding spring 56 is efficiently loaded in bending. For example, a distal end 65 of contact segment 63 may be located at approximately the vertical position of the top of spring screw 58, such as apparently shown in FIGS. 15-16, though the drawings will be understood as illustrative only and not necessarily to scale. This location of distal end 65 would limit the amount of downward deflection of distal end 65 to no more than approximately the vertical thickness of a sink flange, at which point the top of spring screw 58 would typically abut the underside of the countertop, preventing further insertion of binding lip 54. The depth to which middle segment 61 extends downwardly and the relative lengths of middle segment 61 and contact segment 63, as well as other proportional relationships within clamping device 50, may be varied to provide the desired contact between contact segment 63 and a sink flange and the desired bending resistance response of spring 56.

Figure 7:
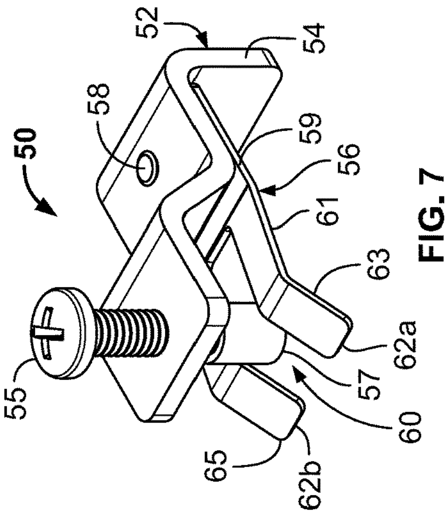
FIG. 7 is a bottom perspective view of a clamping device, according to another embodiment.
Figure 10:
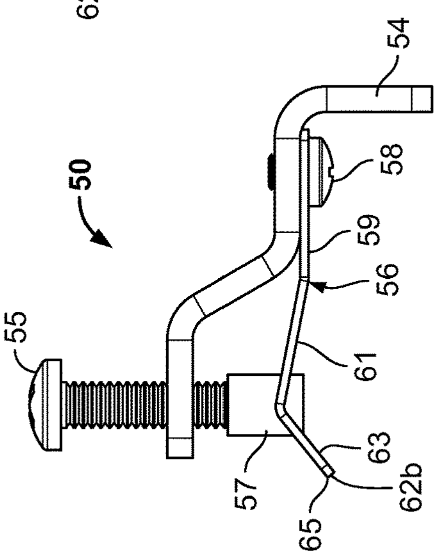
FIG. 10 is an inverted side elevation view of the clamping device shown in FIG. 7.
Figure 14:
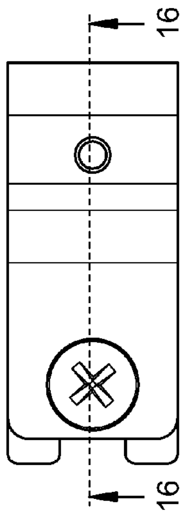
FIG. 14 is a bottom plan view of the clamping device shown in FIG. 12.
Figure 16:
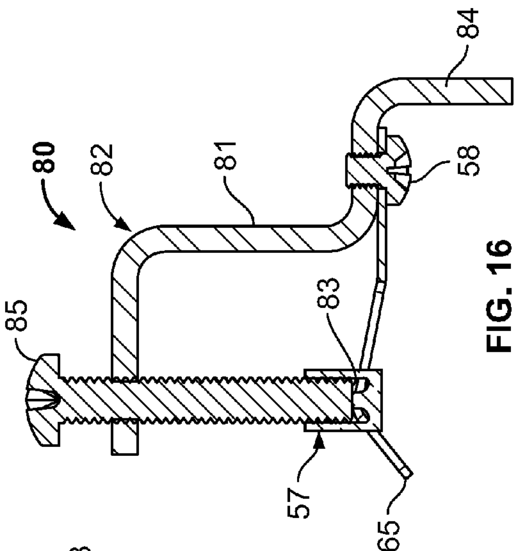
FIG. 16 is a cross-sectional inverted side elevation view of the clamping device shown in FIG. 12.

Binding spring 56 also includes a clamp screw opening 60, defined by a pair of spaced apart tabs 62*a* and 62*b* extending the length of middle segment 61 and contact segment 63. Clamp screw opening 60 is sized and positioned to permit clamp screw cap 57 to fit therethrough in an upright orientation, as best seen in FIG. 7. This permits an installer to insert clamping device 50 until spring 56 engages a sink flange, providing a sufficient bending moment on clamp body 52 to at least temporarily frictionally retain binding lip 54 in a slot, leaving the installer with a free hand to tighten clamp screw 55 until an end face 53 of its shaft or shank, or an end wall 72 of screw cap 57, if included, engages and presses firmly against the sink flange to provide a more permanent binding torque. Bypassing binding spring 56 in this manner advantageously permits clamp screw 55 to be tightened into flush engagement with a flat, horizontal sink flange without the need to force the profile of spring 56 into conformity or alignment with that of the sink flange.

Figure 8:
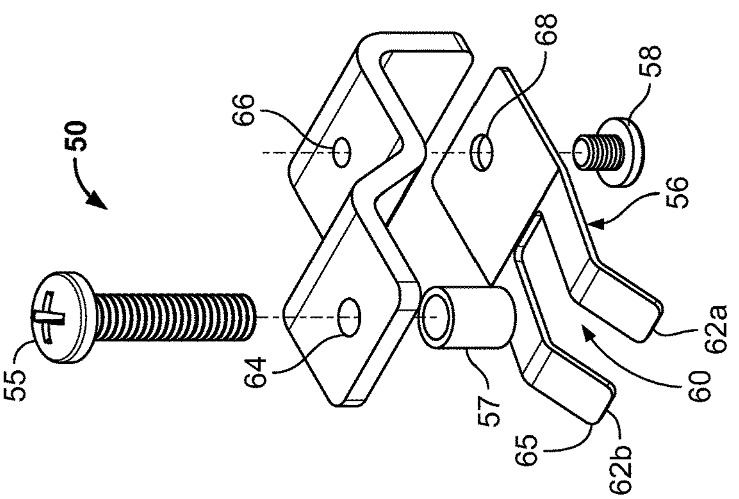
FIG. 8 is an exploded bottom perspective view of the clamping device shown in FIG. 7.

As seen in FIG. 8, clamp body 52 includes a first hole 64 in a generally horizontal end segment opposite binding lip 54, for receiving clamp screw 55, and a second hole 66 in a generally horizontal intermediate segment adjacent binding lip 54, for receiving spring screw 58 inserted through a corresponding hole 68 in connecting segment 59 of binding spring 56 to attach binding spring 56 to clamp body 52.

Screw cap 57 is a one-piece body, preferably of molded plastic, having a generally cylindrical sidewall 70, for retaining an end portion of a shaft of clamp screw 55, connected to an end wall 72 for acting as a buffer between clamp screw 55 and a sink flange. End wall 72 serves to transmit a clamp screw force along the axis of clamp screw 55 and also to isolate a sink flange from frictional torque about the same axis. This torque isolation may be achieved by permitting relative rotation of clamp screw end face 53 against end wall 72 and/or by end wall 72 itself rotating relatively to the sink flange, with minimal friction. In the illustrated embodiment, end wall 72 has a broad flat external end surface to disperse the clamp screw force over a wide area and provide a stable base, but a rounded end surface may better limit friction to facilitate the latter relative rotation.

On the other hand, an internal surface of end wall 72 includes a raised bearing 74 protruding in an axially inward direction, and presenting a bearing surface 76 (shown in FIG. 22) with a diameter $D_2$ significantly smaller than a diameter $D_1$ of an opening 78 of screw cap 57 and smaller than an outer diameter of clamp screw 55. The relatively small contact area of bearing surface 76 against end face 53 of clamp screw 55 promotes low friction therebetween so that clamp screw 55 may freely rotate against bearing surface 76. Bearing surface 76 may also advantageously be rounded (e.g., spherically convex), rather than flat as depicted, for the same purpose. An appropriate height h of bearing 74 may be selected to permit bearing 74 to compress without flattening so as to effectively increase the area of its bearing surface 76, and an appropriate thickness t of end wall 72 may be selected to bear the compressive stress associated with the axial clamp screw force.

Conversely, in another embodiment (not shown), end wall 72 may include a flat internal surface for promoting stable, relatively high friction contact with the end of clamp screw 55 (in lieu of stable contact with the sink flange), and a rounded external surface for promoting low-friction contact with the sink flange.

Figure 13:
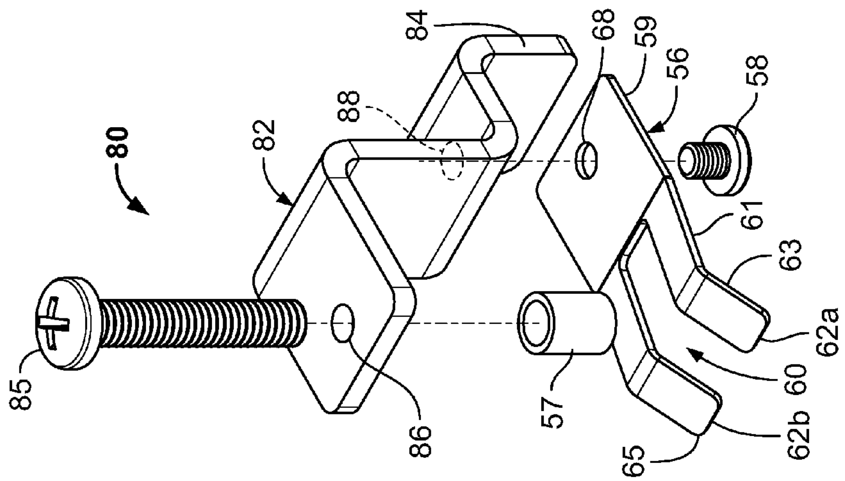
FIG. 13 is an exploded bottom perspective view of the clamping device shown in FIG. 12.
Figure 12:
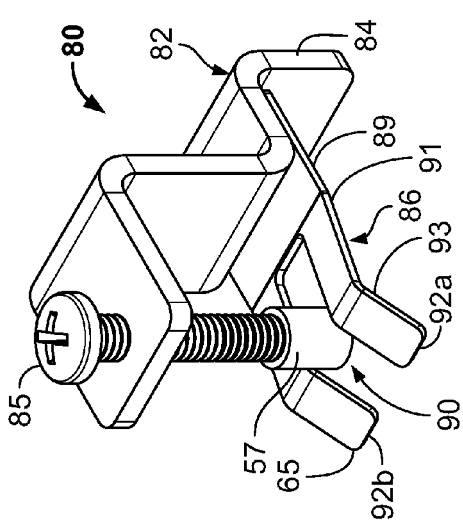
FIG. 12 is a bottom perspective view of a clamping device, according to another embodiment.
Figure 15:
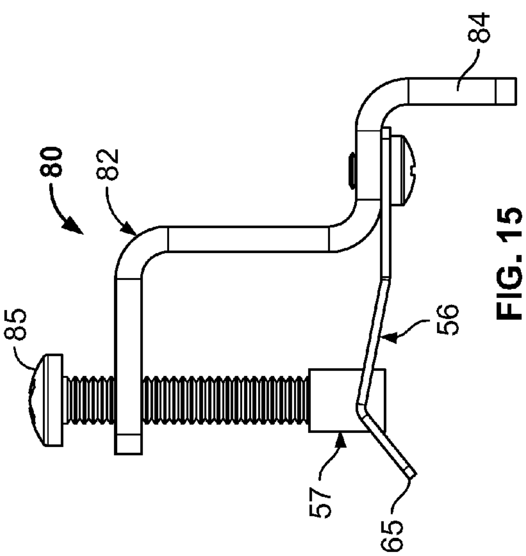
FIG. 15 is an inverted side elevation view of the clamping device shown in FIG. 12.
Figure 19:
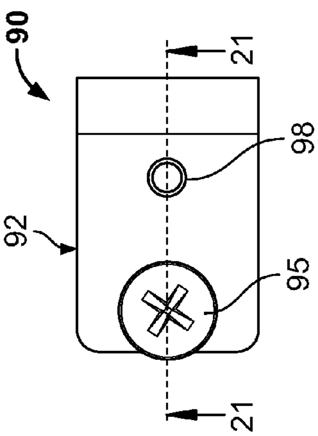
FIG. 19 is a bottom plan view of the clamping device shown in FIG. 17.
Figure 21:
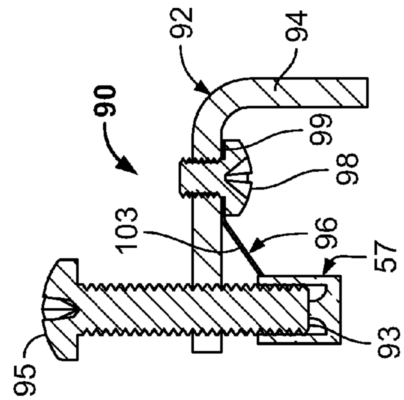
FIG. 21 is a cross-sectional inverted side elevation view of the clamping device shown in FIG. 17.
Figure 18:
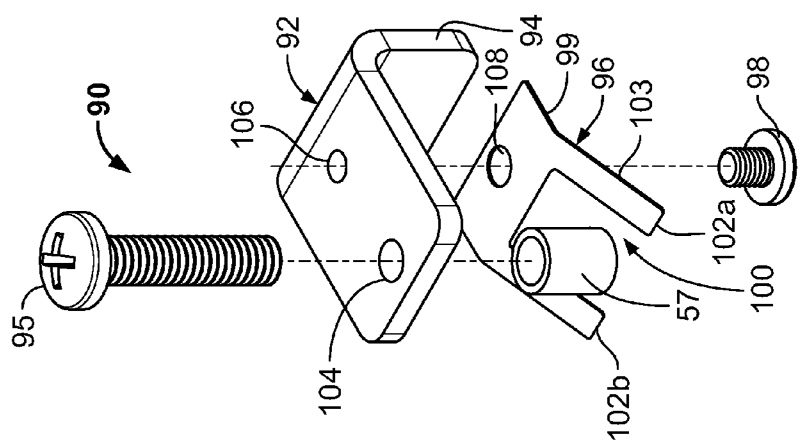
FIG. 18 is an exploded bottom perspective view of the clamping device shown in FIG. 17.
Figure 17:
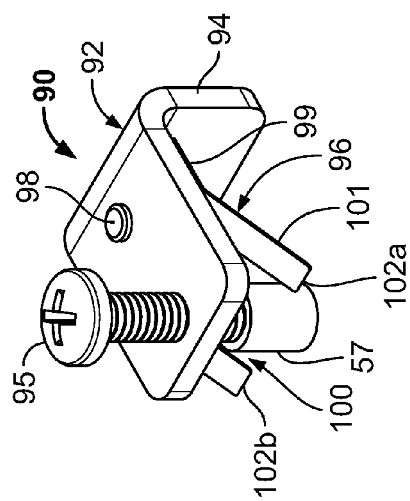
FIG. 17 is a bottom perspective view of a clamping device, according to another embodiment.
Figure 20:
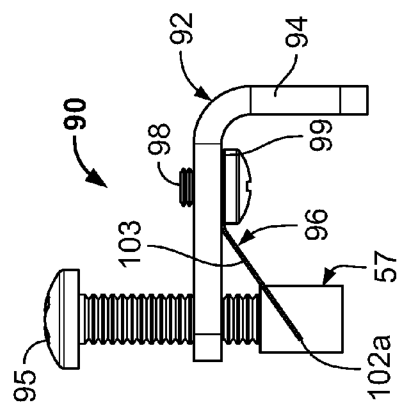
FIG. 20 is an inverted side elevation view of the clamping device shown in FIG. 17.
Figure 22:
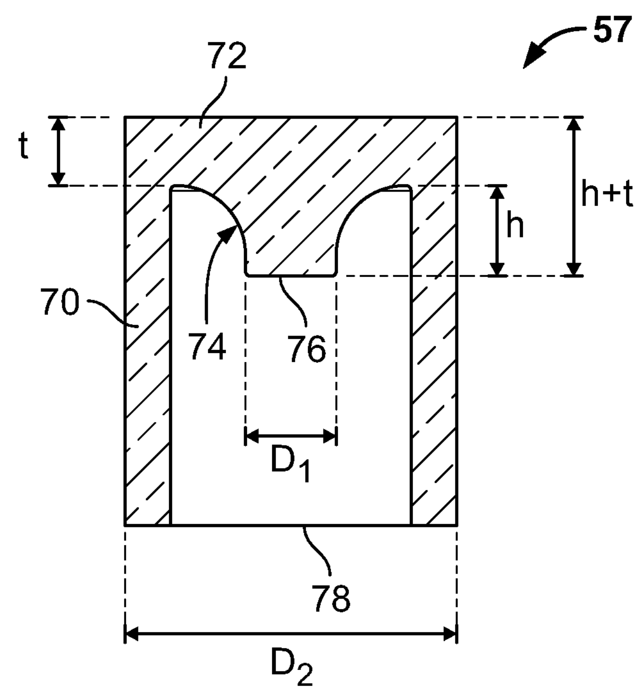
FIG. 22 is a midplane cross-sectional side elevation view of a screw cap used with clamping devices according to embodiments of the invention, oriented as in use.

Referring to FIGS. 12-16, clamping device 80 will now be described in greater detail. Clamping device 80 includes a clamp body 82 with a binding lip 84, a clamp screw 85 with a lower end face 83, optionally capped by the previously described clamp screw cap 57, the previously described binding spring 56, the previously described spring screw 58 attaching binding spring 56 to clamp body 82. As seen in FIG. 13, clamp body 82 includes a first hole 86 in a generally horizontal end segment opposite binding lip 84, for receiving clamp screw 85, and a second hole 88 in a generally horizontal intermediate segment adjacent binding lip 84, for receiving spring screw 58. Clamping device 80 is substantially similar to clamping device 50 in all respects except for having a taller profile, characterized by a segment 81 of clamp body 82 that spans a vertical distance separating a segment bearing first hole 86 from a segment bearing second hole 88. This greater separation accommodates greater variation in sink flange thicknesses, or greater variation in the thickness of the same sink flange.

With reference to FIGS. 17-21, clamping device 90 will now be described in greater detail. Clamping device 90 includes a clamp body 92 with a binding lip 94, a clamp screw 95 with a lower end face 93, optionally capped by the previously described clamp screw cap 57, a binding spring 96, and spring screw 98 attaching binding spring 96 to clamp body 92. As seen in FIG. 13, clamp body 92 includes a first hole 104 for receiving clamp screw 95, and a second hole 106 for receiving spring screw 98, the latter extending through a hole 108 in a connecting segment 99 of binding spring 96. First and second holes 104, 106 are formed in the same generally horizontal segment adjacent binding lip 94, so that clamp body 92 has a compact shape best suited to clamping thin sink flanges, or thin portions thereof.

Spring 96 includes only a single bend, as the shape of body 92 does not allow for a segment extending downwardly from connecting segment 99. Accordingly, binding spring 96 is divided into connecting segment 99 and an upwardly angled contact segment 103, comprising a pair of spaced apart tabs 102*a* and 102*b*, defining a clamp screw opening 100 therebetween to accommodate the passage of clamp screw 95, with or without screw cap 57. Thus, all of the bending of binding spring 96 must occur in contact segment 103, in sharp contrast to contact segment 63 of binding spring 56, which primarily only rotates while the longer and less steeply angled middle segment 61 bears the majority of bending. Additionally, in conjunction with the compact shape of clamp body 92, binding spring 96 is advantageously made as short as possible, so that clamping device 90 may be used for installations where space limitations require slots to be formed very close to the sink flange. Therefore, binding spring 96 may need to have a smaller thickness, and/or tabs 102*a* and 102*b* may need to be narrower than their counterpart tabs 62*a* and 62*b*, as emphasized by their depiction in the drawings, so that contact segment 103 is not too stiff to permit full insertion of binding lip 94 into a slot.

According to the present embodiments described herein, clamping devices according to the invention may be configured such that, once the device is installed, the greater the separating force that can be achieved between a sink and a countertop to which the sink is attached using the device, the higher the holding power that will be realized by the device. One of ordinary skill in the art will further appreciate, after reading and comprehending the present disclosure, that a clamping device according to the present embodiments will further allow a sink that is installed as described above to be more easily removed than can be conventionally accomplished, at a later time if desired, and without risking the countertop to damage from the removal.

Changes may be made in the above methods and systems without departing from the scope hereof. The present inventor further contemplates that the many features disclosed herein may be used together or in combination with the other features disclosed among the several embodiments of the invention. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. An undercounter sink attachment system comprising:

a sink having an outer edge configured to fit about an opening of a countertop having a generally vertical slot formed in a bottom surface of the countertop beside the sink, the slot extending generally alongside the outer edge of the sink when the sink is positioned about said opening under the countertop; and a clamping device for attaching the sink to the countertop, the clamping device having:

a clamp body having an insertable end, said insertable end being configured to insert into the slot of the countertop above the clamp body in an upward insertion direction; and a clamping spring connected to the clamp body, the clamping spring in a relaxed state including a contacting portion extending upwardly from the clamp body forming an upward angle, said upward angle of the relaxed contacting spring portion configured to be deflected by contact of the contacting spring portion with a peripheral portion of the sink toward an angle of the peripheral sink portion to transmit an upward clamping force to said portion of the sink when the insertable end is inserted into the slot, wherein the clamping spring is connected to the clamp body by a fastener horizontally offset from the insertable end.

2. The undercounter sink attachment system of claim 1, wherein the fastener comprises one of a screw and a rivet extending through a hole in the clamping spring and through a spring attachment hole in the clamp body.

3. The undercounter sink attachment system of claim 2, further comprising a clamp screw extending threadably through a clamp screw hole in the clamp body, the clamp screw configured to transmit a generally upward force to one of the clamping spring and the portion of the sink to at least assist in holding the sink to the bottom surface of the countertop when the insertable end is inserted into the slot.

4. The undercounter sink attachment system of claim 3 wherein the clamp screw and spring attachment holes are located on first and second respective portions of the clamp body, and said first and second portions are parallel.

5. The undercounter sink attachment system of claim 3, the insertable end being comprised in a vertical portion of the clamp body bent approximately perpendicularly relative to a horizontal portion of the clamp body that comprises said clamp screw hole.

6. The undercounter sink attachment system of claim 1, further comprising a plurality of similarly constructed clamping devices securing the sink to the countertop.

7. The undercounter sink attachment system of claim 1, said clamp body including said insertable end being integrally formed from a single piece of material.

8. The undercounter sink attachment system of claim 1, wherein the clamping spring is a bending spring, and the deflected angle of the contacting portion of the clamping spring is configured to be aligned with the angle of the peripheral sink portion when the insertable end of the clamping device is inserted into the countertop slot.

9. The undercounter sink attachment system of claim 1, the clamping spring further comprising a generally flat connecting portion connected to the clamp body, and said contacting spring portion comprising a generally flat portion of the clamping spring.

10. The undercounter sink attachment system of claim 9, the clamping spring further comprising a bend disposed between the connecting spring portion and the contact spring portion.

11. A countertop system including the undercounter sink attachment system of claim 1, and further comprising said countertop.

12. A clamping device for mounting a sink to a countertop comprising:
- a clamp body;
- an insertable end of the clamp body, said insertable end being configured for insertion in an upward insertion direction into a slot in a bottom surface of a countertop about a perimeter of a sink, and a width of the slot extending generally alongside the perimeter of the sink; and
- a clamping spring connected to the clamp body, the clamping spring in a relaxed state including a contacting portion extending at an upward angle, the contacting spring portion in said relaxed state configured to contact a portion of the sink when the insertable end is partially inserted into said slot and to be deflected by contact with the portion of the sink to transmit an upward clamping spring force to the portion of the sink when the insertable end is further inserted into said slot, wherein the clamping spring is connected to the clamp body by a fastener horizontally offset from the insertable end.

13. The clamping device of claim 12, wherein the fastener comprises one of a screw and a rivet extending through a hole in the clamping spring and through a spring attachment hole in the clamp body.

14. The clamping device of claim 13, further comprising a clamp screw configured to be inserted through a clamp screw hole in the clamp body, wherein, when the insertable end is inserted into the slot, the clamp body is located so that the clamp screw inserted through said clamp screw hole in the clamp body transmits a generally upward clamp screw force to one of the clamping spring and the portion of the sink to at least assist in holding the sink to the bottom surface of the countertop.

15. The clamping device of claim 14 wherein the clamp screw and spring attachment holes are located on first and second respective portions of the clamp body, and said first and second portions are parallel.

16. The clamping device of claim 14, the insertable end being comprised in a vertical portion of the clamp body bent approximately perpendicularly relative to a horizontal portion of the clamp body that comprises said clamp screw hole.

17. The clamping device of claim 14, the clamping spring comprising an opening to permit the clamp screw to extend through the opening to contact directly said portion of the sink.

18. The clamping device of claim 12, the clamping spring being removable from the clamp body, and the clamp screw configured to contact the portion of the sink directly, to transmit said generally upward force to the portion of the sink to at least assist in holding the sink to the bottom surface of the countertop, when the clamping spring is removed, the insertable end is inserted into the slot, and the perimeter of the sink is disposed alongside the slot.

19. The clamping device of claim 12, said clamp body including said insertable end being integrally formed from a single piece of material.

20. The clamping device of claim 12, the clamping spring further comprising a generally flat connecting portion connected to the clamp body, and said contacting spring portion comprising a generally flat portion of the clamping spring.

21. The clamping device of claim 20, the clamping spring further comprising a bend disposed between the connecting spring portion and the contacting spring portion.

22. A method of installing a sink to a countertop, a perimeter of the sink being configured to fit about an opening of the countertop, comprising:
- forming a slot extending generally upwardly into a bottom surface of the countertop, the slot having a width longer than a thickness of the slot, the width of the slot extending alongside the perimeter of the sink when the sink is positioned under the countertop;
- inserting an insertable end of a clamp body of a clamping device into the slot;
- when the insertable end is partially inserted into the slot, contacting a portion of the sink with a contacting portion of a clamping spring connected to the clamp body, the contacting portion extending at an upward angle when the clamping spring is in a relaxed state; and
- when the insertable end is further inserted into the slot, deflecting said contacting spring portion against the portion of the sink to transmit a generally upward clamping spring force to the portion of the sink, wherein the clamping spring is connected to the clamp body by a fastener horizontally offset from the insertable end.

23. A clamping device for mounting a sink to a countertop comprising:
- a clamp body;
- an insertable end of the clamp body, said insertable end being configured for insertion in an upward insertion direction into a slot in a bottom surface of a countertop about a perimeter of a sink, and a width of the slot extending generally alongside the perimeter of the sink;

a clamp screw extending threadably through a clamp screw hole in the clamp body; and a clamp screw cap disposed over an end of the clamp screw;

the clamp screw being configured to transmit a generally upward force through the clamp screw cap to a portion of the sink to at least assist in holding the sink to the bottom surface of the countertop when the insertable end is inserted into said slot.

24. The clamping device of claim 23, the clamp screw cap comprising a sidewall configured to surround a shaft of the clamp screw and an end wall comprising a bearing surface configured to abut an end of the mounting screw.

25. The clamping device of claim 24, the bearing surface being generally flat and having a diameter smaller than a diameter of the clamp screw shaft.

26. The clamping device of claim 23, further comprising a clamping spring connected to the clamp body, the clamping spring configured to contact a portion of the sink when the insertable end is partially inserted into said slot and to be deflected by contact with the portion of the sink to transmit an upward clamping spring force to the portion of the sink when the insertable end is further inserted into said slot, the clamping spring comprising an opening permitting the screw cap disposed over the end of the clamp screw to extend through said opening and to contact said portion of the sink when the insertable end is inserted into said slot.

* * * * *